Oct. 13, 1931.  A. G. MERRIMAN  1,827,598
MOVING PICTURE CABINET
Filed May 2, 1928  5 Sheets-Sheet 1

Arthur G. Merriman, INVENTOR
BY
Fred J. Harbaugh, ATTORNEY

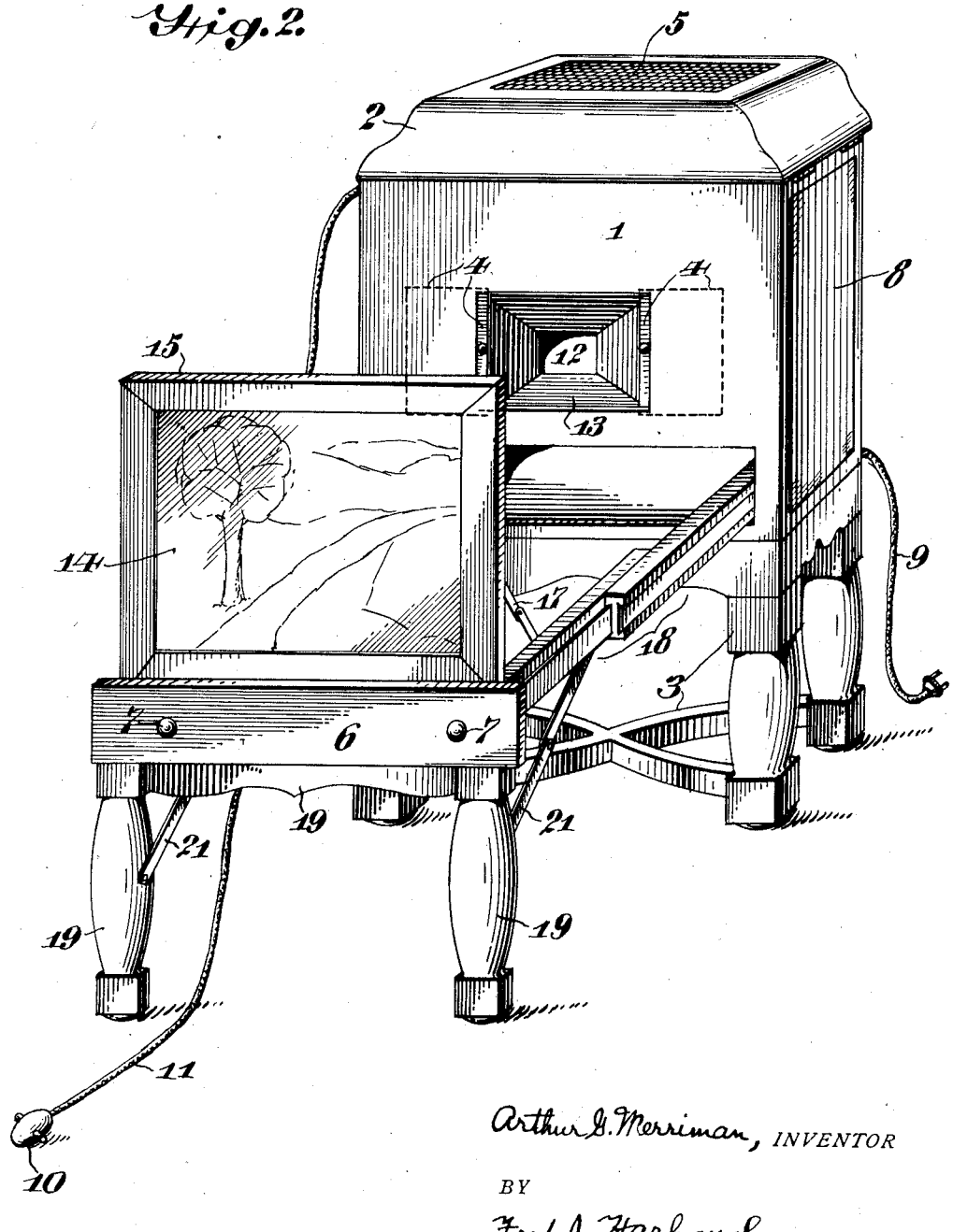

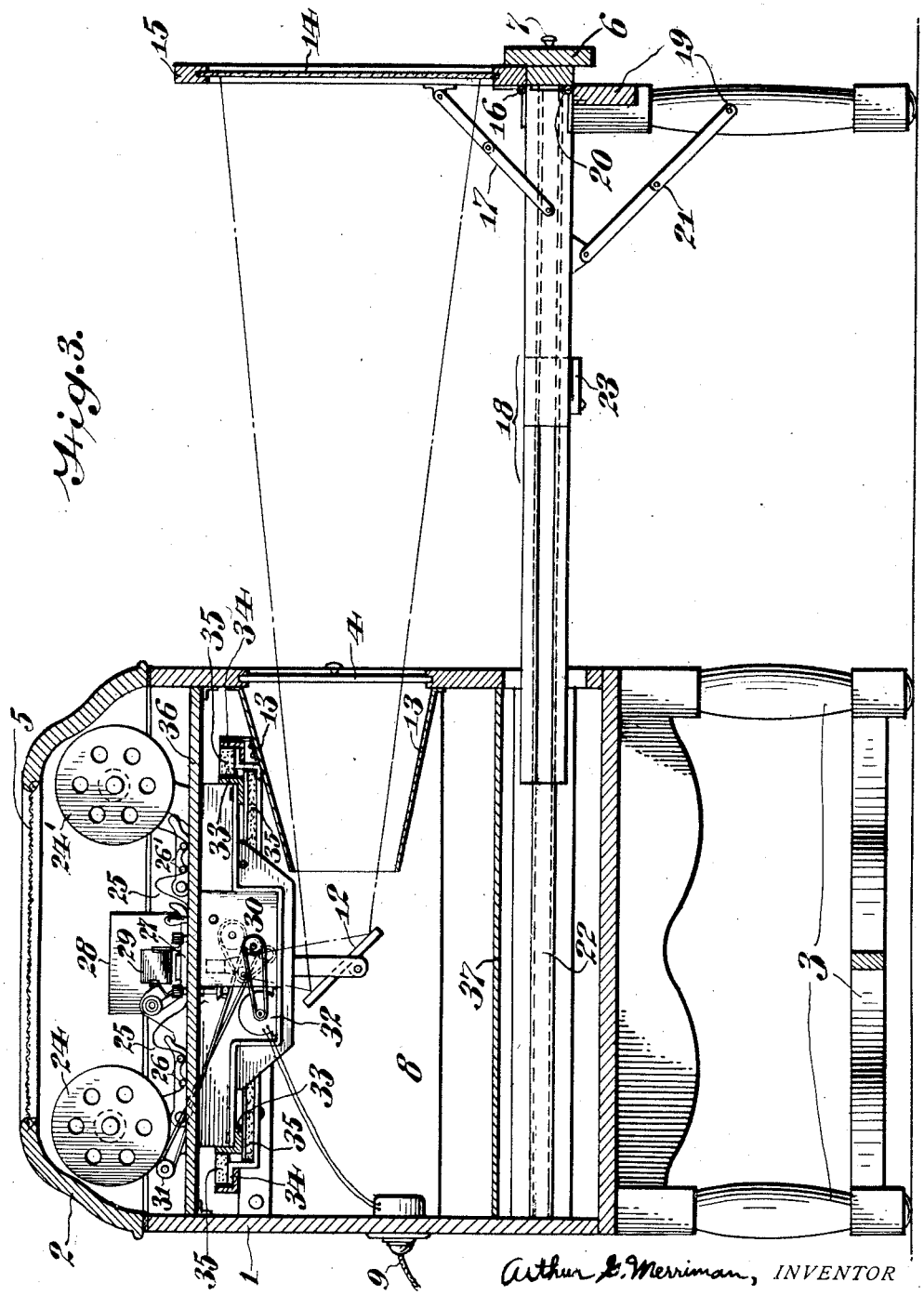

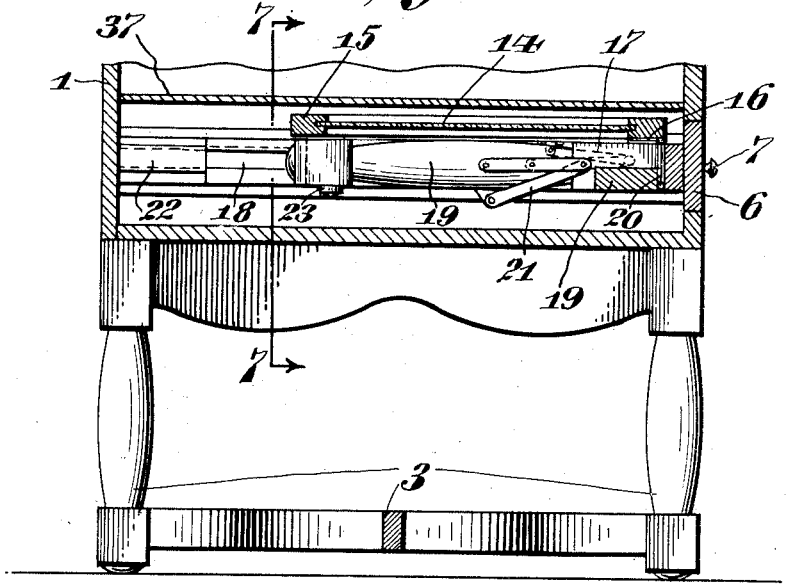
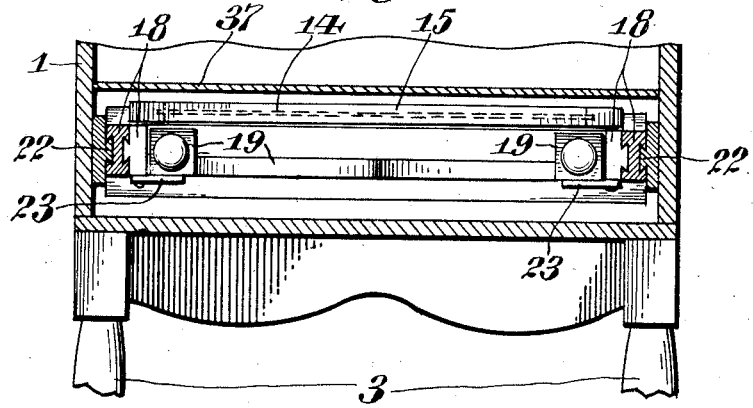

Oct. 13, 1931.  A. G. MERRIMAN  1,827,598
MOVING PICTURE CABINET
Filed May 2, 1928  5 Sheets-Sheet 5

Arthur G. Merriman, INVENTOR
BY
Fred J. Harbaugh, ATTORNEY

Patented Oct. 13, 1931

1,827,598

UNITED STATES PATENT OFFICE

ARTHUR G. MERRIMAN, OF PHILADELPHIA, PENNSYLVANIA

MOVING PICTURE CABINET

Application filed May 2, 1928. Serial No. 274,473.

My invention relates to improvements in motion picture cabinets, and it consists in the combinations, constructions and arrangements herein described and claimed.

The present invention contemplates the provision of an improvement over the motion picture cabinets which are disclosed in Letters Patent of the United States 1,460,071 and 1,551,259, granted to me June 26, 1923, and August 25, 1925, respectively, for a cabinet case having a translucent screen as a part of a vertical wall thereof, and having novel arrangements of light emitting elements, film supporting and feeding means, and means for utilizing rays of light from the light emitting element and the film to project on the screen images of pictures on the film.

In addition to the objects of my two Patents 1,460,071, and 1,551,259 an object of the present invention is to provide an improved motion picture cabinet of the character described in which the translucent screen is a part of the cabinet, and is supported by suitable folding and sliding elements so disposed that the screen may take a vertical position some distance in front of the cabinet when in use, whereby the rays of light for projecting the picture on the screen may travel a relatively great distance in passing from the projecting lens to the screen and thereby produce a picture of relatively large size on the screen.

A further object of the invention is to so provide that when the screen is not in use it may assume a horizontal position together with its supporting elements, and be pushed with them entirely into a space provided therefor within the cabinet, whereby the screen is kept as part of the cabinet and protected from injury.

A further object of the invention is to provide, in a cabinet of the character described, an improved and simplified light transmitting means which will insure the projection on the screen of a clear and sharply defined picture.

A still further object of the invention is to provide, in a cabinet of the character described, means of ventilation for the convection of the heat produced by the light emitting element, whereby parts of the cabinet are protected from excessive heat.

A still further object is to provide in a cabinet of the character described, a position of the light emitting element which will best protect the film from heat.

Other objects and advantages will be apparent from the following description, considered in conjunction with the accompanying drawings, in which:

Figure 2 is also a perspective view showing the same cabinet open and in use.

Figure 3 is a view, mainly in longitudinal section and side elevation, showing, in the preferred form, certain of the elements of the motion picture apparatus of the cabinet exhibited in Figures 1 and 2, and showing the arrangement of the translucent screen and its supporting elements.

Figure 4 is a longitudinal section showing the translucent screen and its supporting elements as they appear when folded together and pushed into the space provided for them in the cabinet.

Figure 5 is a vertical section from Figure 4 on the line 7—7 and serves to further illustrate the arrangement of the screen and its supporting elements when they are folded together and pushed into the cabinet.

Figure 1:
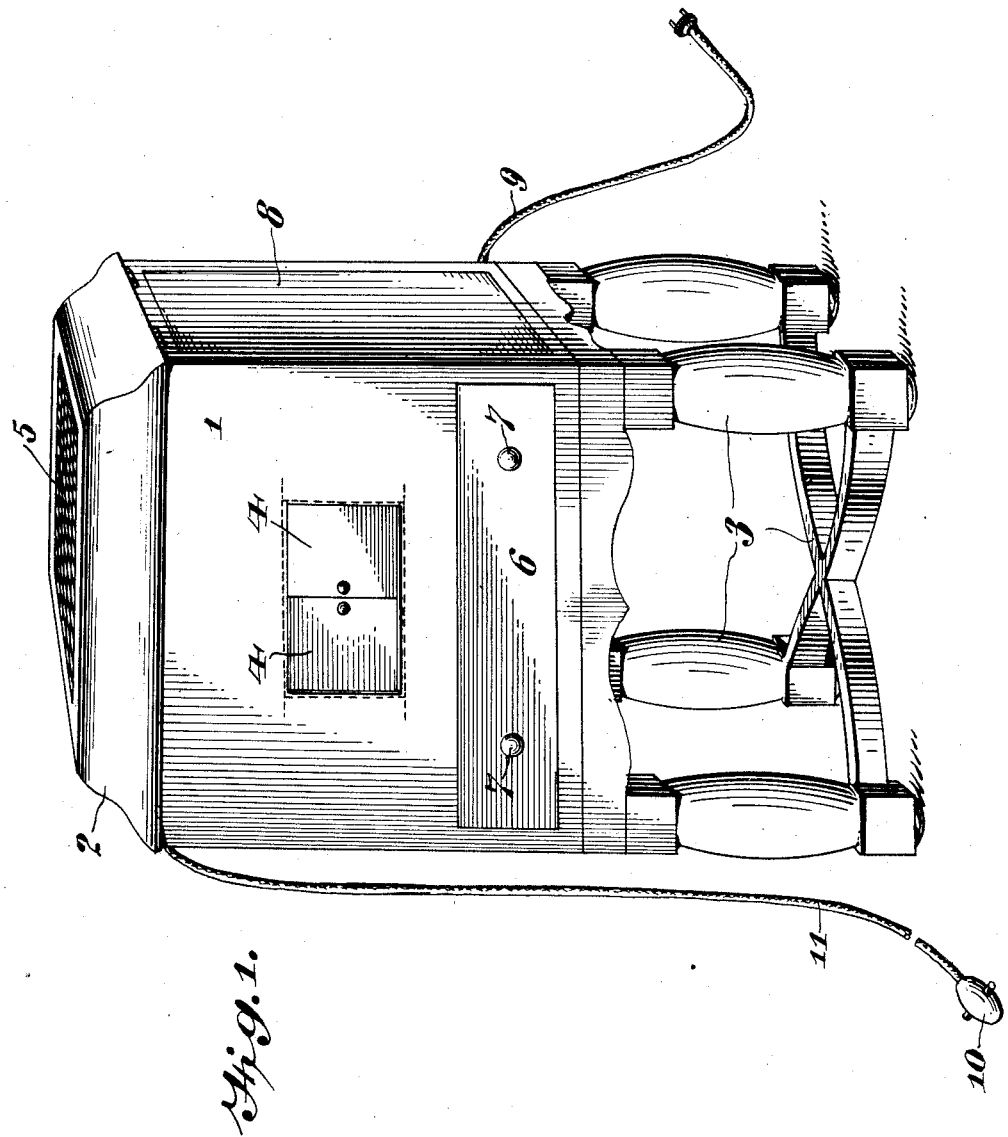
Figure 1 is a perspective view showing a motion picture cabinet embodying the present invention. In this view the cabinet is shown as it appears when closed, and not in use.

In Figure 1, I show a cabinet 1 having a lid 2 raisable from the body to permit access to the interior of the cabinet, and preferably hinged to the body of the cabinet. The cabinet is provided with a base supporting framework 3 which supports the cabinet at such a height that it is conveniently accessible to a person of average height. Doors 4 are slidably mounted in the front side of the cabinet and are opened when the cabinet is in operation to permit the outlet of the projection beam of light. A wire screen 5 comprises the top of the lid of the cabinet and, together with openings in the front and bottom of the cabinet, allows free ventilation so that the cabinet and film are protected from excessive heat which may be produced by the light emitting element. A panel 6 is attached to the screen and its supporting elements and covers them when the cabinet is closed. Handles 7 on this panel 6 permit it to be pulled forward when the cabinet is opened for use. An auxiliary panel 8 is provided in the side of the cabinet to permit access to the inner framework and motion picture apparatus. An electric attachment device and cord 9 are provided in the back of the cabinet to supply electric power to the apparatus inside. A hand switch 10 and cord 11 are provided for controlling the electric motor driving the motion picture apparatus. This enables the operator to take a position some distance in front of the cabinet so that he can see the pictures and, at the same time control them. This cord with switch is usually rolled together and placed inside of the top of the cabinet when not in use.

In Figure 2, I show the same cabinet as in Figure 1, but opened, and in operation. The doors 4, are pushed back to permit the projection of the light beam horizontally forward from the mirror 12 through the light cone 13, and upon the back of the translucent screen 14, the pictures appearing on the front of the screen due to its translucence. This screen 14 is mounted in a frame 15, and this frame 15 is mounted by hinges 16, and folding brackets 17 (see Fig. 3) on a sliding framework 18. The screen with its frame and sliding framework is shown supported by leg framework 19. This is attached to the sliding framework 18, by hinges 20 and folding brackets 21. The sliding framework 18 is supported by slides 22, attached to the sides of the cabinet on its inside walls.

In Figures 4 and 5, I show the appearance of these elements 14 to 23 when they are folded together and pushed into the cabinet. A knob, 23, supports the leg framework when folded.

In Figure 3, I show a longitudinal section of the cabinet in operation, showing the preferred form of the arrangement of the motion picture apparatus inside of the cabinet. In this arrangement of the motion picture apparatus 24, are the reels, 25 is the film which, by reason of its horizontal disposition greatly facilitates the operation of threading. The film from the first reel 24, threads through the rollers 26, then through the film gate, 27, then through the second set of rollers 26', and then on to the second reel 24', the operation taking place from left to right on the diagram. The lamp in the lamp house 28 sends a beam of light on to the mirror 29. This mirror, being at an angle of about 45 degrees, reflects the light down through the film and projecting lens onto the mirror 12. The mirror 12, being also at an angle of about forty-five degrees, sends the beam of light forward on to the translucent screen 14. These mirrors 12 and 29, are both pivotally mounted for adjustment.

The machinery for driving the motion picture apparatus is represented at 30, the rewind pulley and belt at 31, and the electric motor at 32. The inner supporting framework for the apparatus is represented at 33, the outer supporting framework at 34, and the cushions between the inner and outer supporting frameworks, at 35. These cushions are preferably made of sponge rubber and they serve to effectively cushion vibration when the apparatus is in operation. This entire apparatus is described in detail in a copending patent application, (Serial #274,472 filed May 2, 1928).

A partition 36 is located in the cabinet and suitably supported so that only those parts of the apparatus which are handled in operation extend above the partition. The partition thus covers practically all of the working parts of the apparatus and also affords a platform on which to place films and other paraphernalia used in connection with the apparatus. For instance, when a reel 24 is removed from its hub it is placed on the platform while another similar reel containing a different film is set in place on the hub, and the latter film displayed. In the present model of my apparatus this partition 36 is made of asbestos as a means of safeguard in possible rare cases of combustion of the film, but thorough tests under extreme conditions have proved that trouble from this source is negligible because of the safety film used, and because of a heat absorbing glass used to protect the film from the heat given out by the light emitting element.

Another partition 37 in the lower part of the cabinet as shown is advantageous in protecting the translucent screen 14 from injury. See Figures 4 and 5.

The cabinet is divided by means of partitions 36 and 37, into upper, central and lower compartments respectively.

Although a small translucent screen has been shown, it is obviously within the scope of my invention to provide a larger folding opaque screen, in which case it would of course be necessary to have a longer extension of the sliding framework to accommodate the longer projection distance necessary for a larger picture.

The essence of this invention being to combine a motion picture apparatus, cabinet, and screen in one article of furniture whereby the facilities for motion picture entertainment are in one "self contained unit", it is obvious that the invention may assume other forms than the preferred form which has been described. Among these other various forms which the invention may assume, I have illustrated one which I consider of importance in Figure 6.

Figure 6:
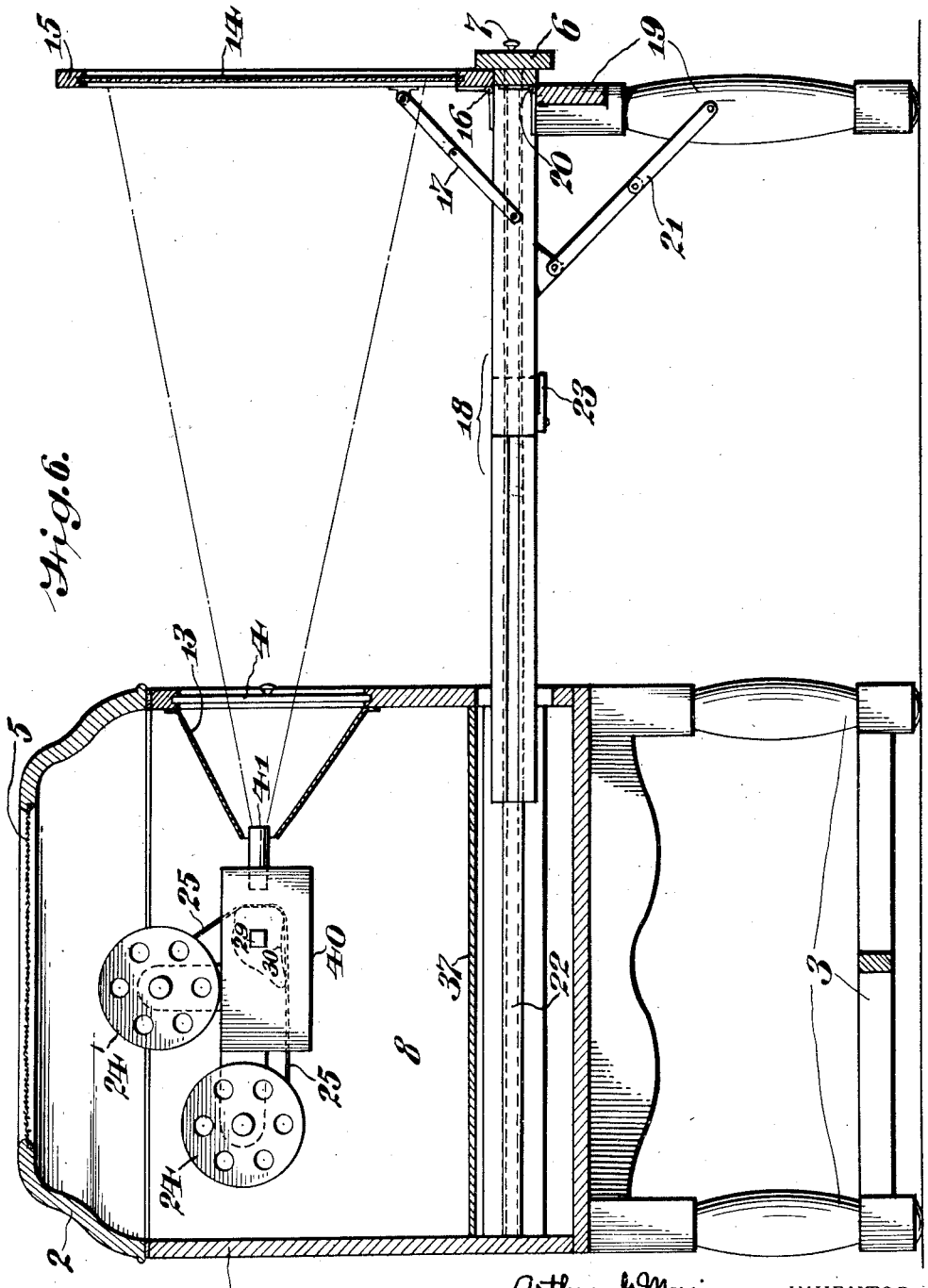
Figure 6 is a view, mainly in longitudinal section and side elevation showing one of several possible methods of arrangement of motion picture apparatus in the cabinet as embodied in this invention.

In Figure 6, the reels 24 are arranged near the center and back of the cabinet respectively. They are suitably mounted on the unit 40, which is supported near the center of the cabinet. This unit 36 is the frame or box which carries the lamp house (not shown), the mirror 29, the machinery 30, and the projection lens 41. Other important elements of the apparatus such as an electric driving motor, and a condensing lens are carried by this unit 40, but they are not shown. It is obvious that the cabinet, when considered as a motion picture cabinet is unchanged because of the rearrangement of the motion picture apparatus.

It is apparent that other forms could be used for the cabinet itself when considered distinctly apart from the motion picture apparatus, and I therefore consider as my own all such modifications and adaptations of the forms thereof herein described as fairly fall within the scope of the appended claims.

I claim:—

1. In a moving picture apparatus, a housing comprising a plurality of walls one of which is vertical, a plurality of horizontal compartments within said walls in superposed relation, said vertical wall having an upper and a lower opening, means in one of said compartments for projecting a cinematic beam outwardly through one of said openings in said vertical wall, a screen external to said housing and spaced opposite said vertical wall for receiving said beam, a support for said screen comprising a folding framework, said framework and said screen adapted to fold into a substantially horizontal plane and slide into another of said compartments through the other of said openings.

2. In a moving picture apparatus, a housing comprising a plurality of enclosing walls one of which is provided with an upper and a lower opening, a plurality of horizontal compartments within said walls in superposed relation, means in one of said compartments for projecting a cinematic beam outwardly through said upper opening, a screen external to said housing and spaced opposite to said wall with the openings for receiving said beam, a support for said screen comprising a folding framework, said framework and said screen being adapted to fold into a substantially horizontal plane and slide into said housing through said lower opening, members horizontally disposed on the walls of said housing in registering relation with said lower opening for supporting said framework, conjugate means on said framework cooperating with said members.

3. In a picture projection apparatus, a cabinet housing comprising enclosing walls one of which is provided with upper and lower openings, means disposed within said housing for projecting a cinematic beam outwardly through said upper opening, a screen for receiving said beam, a telescoping framework connected to said housing and extensible outwardly therefrom through said lower opening for supporting said screen opposite said wall with the openings and distant therefrom, said screen being foldable into the plane of said framework and adapted to be moved into said housing through said lower opening.

4. In a picture projection apparatus, a housing comprising enclosing sides, one of said sides being provided with openings, means disposed within said housing for projecting a cinematic beam outwardly from said housing, a screen for receiving said beam, a telescoping framework connected to said housing and extensible outwardly therefrom in a horizontal plane through one of said openings for supporting said screen in spaced relation to one side of said housing, said screen being adapted to fold into the plane of said framework and slide transversely together with said framework into said housing through one of said openings in a horizontal position.

ARTHUR G. MERRIMAN.